(12) United States Patent
Chang et al.

(10) Patent No.: US 8,913,017 B2
(45) Date of Patent: Dec. 16, 2014

(54) TOUCH SENSING SYSTEM, ELECTRONIC TOUCH APPARATUS, AND TOUCH SENSING METHOD

(75) Inventors: Tsen-Wei Chang, Taichung County (TW); Wing-Kai Tang, Hsinchu (TW); Ching-Chun Lin, Taipei County (TW); Ching-Ho Hung, Hsinchu (TW); Hsien-Lung Chen, Taichung (TW); Jiun-Jie Tsai, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 832 days.

(21) Appl. No.: 13/069,416

(22) Filed: Mar. 23, 2011

(65) Prior Publication Data
US 2011/0234523 A1 Sep. 29, 2011

(30) Foreign Application Priority Data
Mar. 25, 2010 (TW) ................................ 99108928 A

(51) Int. Cl.
*G06F 3/041* (2006.01)
*G06F 3/044* (2006.01)

(52) U.S. Cl.
CPC .............. *G06F 3/044* (2013.01); *G06F 3/0416* (2013.01); *G06F 2203/04104* (2013.01)
USPC ....................................... 345/173; 178/18.06

(58) Field of Classification Search
None
See application file for complete search history.

(56) References Cited

U.S. PATENT DOCUMENTS

| 7,372,455 | B2 * | 5/2008 | Perski et al. | 345/173 |
| 8,555,032 | B2 * | 10/2013 | Snyder | 712/32 |
| 2002/0196238 | A1 * | 12/2002 | Tsukada et al. | 345/173 |
| 2007/0229468 | A1 * | 10/2007 | Peng et al. | 345/173 |
| 2008/0162996 | A1 * | 7/2008 | Krah et al. | 714/27 |
| 2008/0309631 | A1 * | 12/2008 | Westerman et al. | 345/173 |
| 2009/0229892 | A1 * | 9/2009 | Fisher et al. | 178/18.03 |
| 2009/0251434 | A1 * | 10/2009 | Rimon et al. | 345/173 |
| 2009/0284495 | A1 * | 11/2009 | Geaghan et al. | 345/174 |
| 2010/0085325 | A1 * | 4/2010 | King-Smith et al. | 345/174 |
| 2010/0164889 | A1 * | 7/2010 | Hristov et al. | 345/173 |
| 2010/0245286 | A1 * | 9/2010 | Parker | 345/174 |
| 2010/0328262 | A1 * | 12/2010 | Huang et al. | 345/174 |
| 2011/0025629 | A1 * | 2/2011 | Grivna et al. | 345/173 |
| 2011/0156839 | A1 * | 6/2011 | Martin et al. | 333/172 |
| 2011/0172745 | A1 * | 7/2011 | Na et al. | 607/88 |
| 2011/0267304 | A1 * | 11/2011 | Simmons et al. | 345/174 |

FOREIGN PATENT DOCUMENTS

| CN | 101308431 | 11/2008 |
| CN | 101501618 | 8/2009 |
| TW | 200949638 | 12/2009 |
| TW | 201013485 | 4/2010 |

* cited by examiner

*Primary Examiner* — Antonio Xavier
(74) *Attorney, Agent, or Firm* — Jianq Chyun IP Office

(57) ABSTRACT

A touch sensing system including a touch interface, at least one sensing unit, and a switching unit is provided. The sensing unit is coupled to the touch interface. The touch sensing system is switched to a first sensing mode or a second sensing mode by the switching unit according to a control signal. When the touch sensing system is in the first sensing mode, the sensing unit senses a first sensing signal and a second sensing signal of the touch interface. On the other hand, when the touch sensing system is in the second sensing mode, the sensing unit senses the first sensing signal according to a driving signal. An electronic touch apparatus and a touch sensing method are also provided.

18 Claims, 3 Drawing Sheets

TOUCH SENSING SYSTEM, ELECTRONIC TOUCH APPARATUS, AND TOUCH SENSING METHOD

CROSS-REFERENCE TO RELATED APPLICATION

This application claims the priority benefit of Taiwan application serial no. 99108928, filed Mar. 25, 2010. The entirety of the above-mentioned patent application is hereby incorporated by reference herein and made a part of this specification.

BACKGROUND OF THE INVENTION

1. Field of the Invention

The invention relates to a touch system, an electronic apparatus and a sensing method. More particularly, the invention relates to a touch sensing system, an electronic touch apparatus and a touch sensing method.

2. Description of Related Art

Presently, touch panels are generally classified into resistive touch panels, capacitive touch panels, infrared touch panels, and ultrasonic touch panels, etc., wherein the resistive touch panels and the capacitive touch panels are commonly used products. Compared with the resistive touch panels which can only detect the operation of an user when the panel is pressed by the user, the capacitive touch panels can easily detect the operation of the user when the user's finger touches the panel or is suspended over the panel. In the conventional art, the capacitive touch panels detect a capacitance variation in sensing lines to obtain touch information of a single point or two points.

SUMMARY OF THE INVENTION

The invention is directed to a touch sensing system, which has two sensing modes.

The invention is directed to an electronic touch apparatus, which includes the aforementioned touch sensing system and is capable of providing a suitable sensing mode according to a functional requirement.

The invention is directed to a touch sensing method, by which two sensing modes are provided.

The invention provides a touch sensing system including a touch interface, at least one sensing unit, and a switching unit. The sensing unit is coupled to the touch interface. The touch sensing system is switched to a first sensing mode or a second sensing mode by the switching unit according to a control signal. When the touch sensing system is in the first sensing mode, the sensing unit senses a first sensing signal and a second sensing signal of the touch interface. When the touch sensing system is in the second sensing mode, the sensing unit senses the first sensing signal according to a driving signal.

In an embodiment of the invention, the at least one sensing unit is coupled to the switching unit, and senses the second sensing signal during the first sensing mode.

In an embodiment of the invention, the at least one sensing unit includes a first sensing unit and a second sensing unit. The first sensing unit is coupled to the touch interface, and senses the first sensing signal. The second sensing unit is coupled to the switching unit, and senses the second sensing signal during the first sensing mode.

In an embodiment of the invention, the touch sensing system further includes a driving unit. The driving unit is coupled to the switching unit, and outputs the driving signal to the touch interface according to the control signal during the second sensing mode.

In an embodiment of the invention, the control signal is generated according to touch information of the touch interface.

In an embodiment of the invention, the touch information is at least one of the first sensing signal and the second sensing signal.

In an embodiment of the invention, the control signal is generated according to an external instruction.

In an embodiment of the invention, the switching unit includes at least one of a microprocessor, a switching device and a logic operation unit.

The invention also provides an electronic touch apparatus including the aforementioned touch sensing system and a processing unit. The processing unit is coupled to the sensing unit and the switching unit. The processing unit generates the aforementioned control signal, and determines at least one touch position on the touch interface according to at least one of the first sensing signal and the second sensing signal.

In an embodiment of the invention, the processing unit generates the aforementioned control signal according to touch information of the touch interface.

In an embodiment of the invention, the processing unit generates the aforementioned control signal according to an external instruction.

The invention further provides a touch sensing method adapted to a touch sensing system. The touch sensing method includes following steps. The touch sensing system is switched to a first sensing mode or a second sensing mode according to a control signal. When the touch sensing system is in the first sensing mode, a first sensing signal and a second sensing signal of the touch interface are sensed. On the other hand, when the touch sensing system is in the second sensing mode, the first sensing signal is sensed according to a driving signal.

In an embodiment of the invention, the touch sensing method further includes generating the control signal according to touch information of the touch interface. Moreover, the touch information is, for example, at least one of the first sensing signal and the second sensing signal.

In an embodiment of the invention, the touch sensing method further includes generating the control signal according to an external instruction.

According to the above descriptions, the touch sensing system of the invention has the first sensing mode and the second sensing mode, so that a suitable sensing mode is capable of being provided according to requirements of a user or a system.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
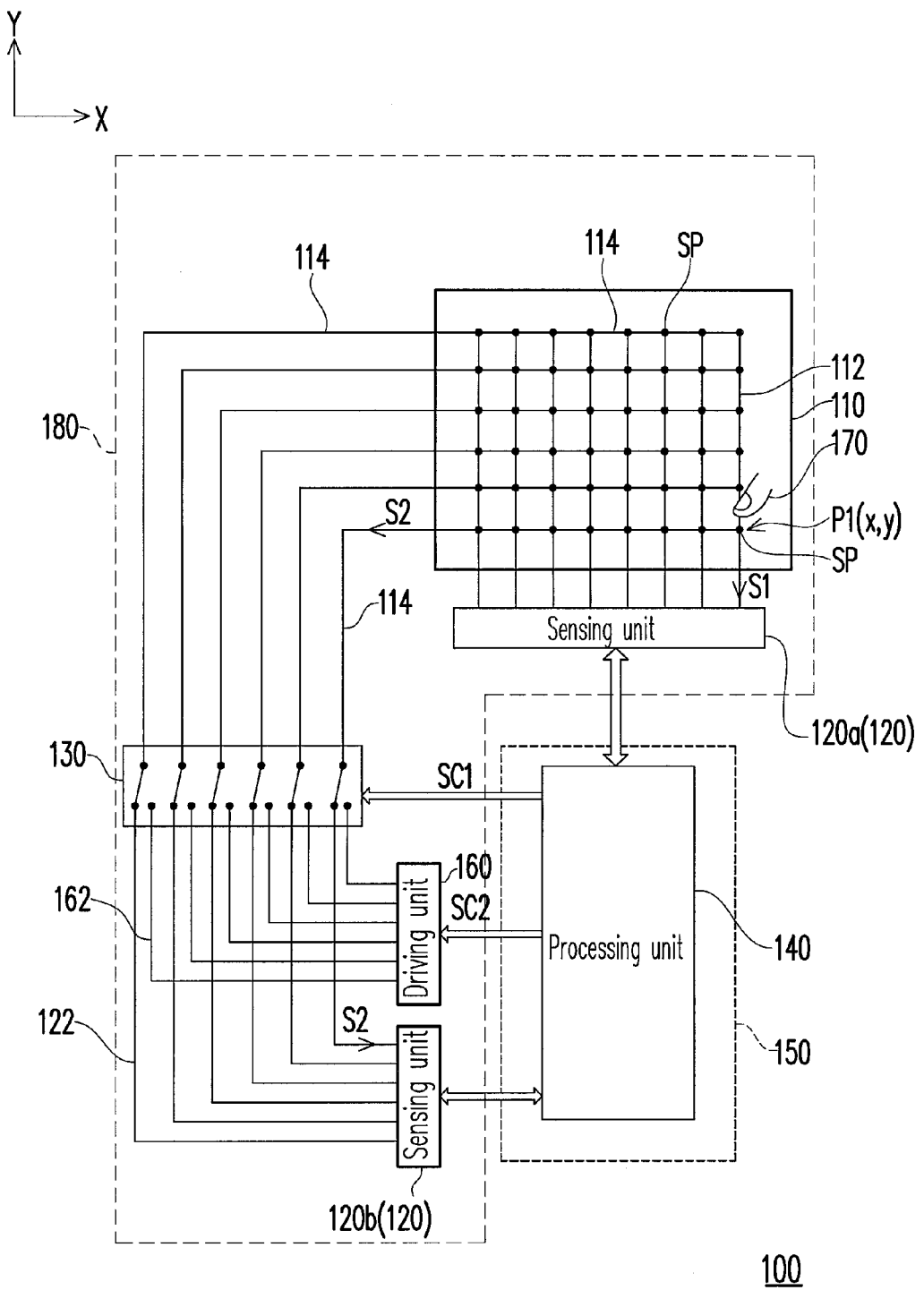
FIG. 1 is a block diagram illustrating an electronic touch apparatus in a first sensing mode according to an embodiment of the invention.
Figure 2:
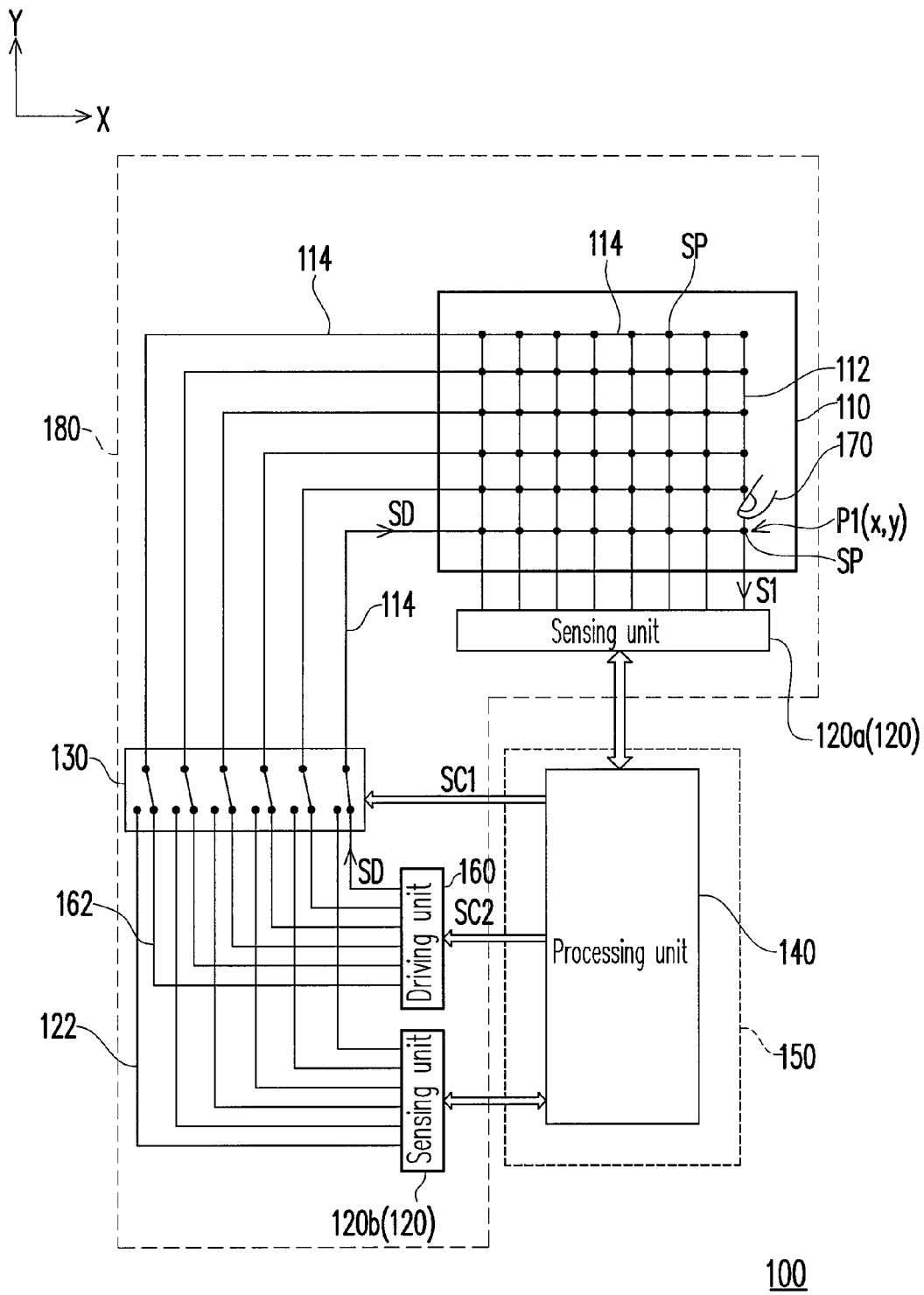
FIG. 2 is a block diagram illustrating an electronic touch apparatus in a second sensing mode according to an embodiment of the invention.

FIG. 1 and FIG. 2 are respectively block diagrams illustrating an electronic touch apparatus in a first sensing mode and a second sensing mode according to an embodiment of the invention. Referring to FIG. 1, the electronic touch apparatus 100 of the present embodiment includes a touch interface 110, at least one sensing unit 120, a switching unit 130, and a processing unit 140. The touch interface 110 is, for example, a touch panel of a generally display apparatus, or other touch pads having a touch sensing function. Moreover, in the present embodiment, the electronic touch apparatus 100 further includes a driving unit 160. The driving unit 160 is coupled to the switching unit 130 and the processing unit 140, and is suitable for transmitting a driving signal. The driving unit 160 determines whether or not to transmit the driving signal according to a control signal SC2, for example.

In addition, the processing unit 140 is, for example, embedded in a carrier unit 150, and the carrier unit 150 is, for example, a computer system or any other electronic device having a processing unit. Moreover, the processing unit 140 of the present embodiment is coupled to the sensing unit 120 and the switching unit 130. Although sensing units 120a and 120b of the present embodiment are illustrated at different places of FIG. 1, each of the sensing units 120a and 120b is actually a part of the sensing unit 120.

As shown in FIG. 1, the switching unit 130 switches a touch sensing system 180 of the electronic touch apparatus 100 to the first sensing mode or the second sensing mode according to a control signal SC1, and the control signal SC1 is, for example, output from the processing unit 140, and may be generated according to an external instruction or automatically generated according to a functional requirement of the carrier unit 150. On the other hand, the switching unit 130 may include at least one of a microprocessor, a switching device and a logic operation unit.

In FIG. 1, the electronic touch apparatus 100 of the present embodiment is switched to the first sensing mode, and the first sensing mode of the present embodiment is, for example, a self-capacitance sensing mode. In the self-capacitance sensing mode, touch information of a single point is obtained according to a capacitance variation of single sensing line. As shown in FIG. 1, in case of the self-capacitance sensing mode, the switching unit 130 switches the sensing unit 120b for coupling to the touch interface 110. In detail, second lines 114 of the touch interface 110 are coupled to sensing lines 122 of the sensing unit 120b through the switching unit 130. In this way, the sensing unit 120b is capable of sensing signals of the touch interface 110 through the second lines 114 and the sensing lines 122.

Referring to FIG. 1, the touch interface 110 includes a plurality of first lines 112 and a plurality of second lines 114, wherein the first lines 112 and the second lines 114 form a plurality of sensing points SP. When a touch object 170 (for example, a finger) approaches to the sensing point SP located at a position P1 of the touch interface 110, the sensing unit 120a detects a sensing signal S1, and the sensing signal S1 is, for example, a capacitance variation between the first line 112 corresponding to the position P1 and a fixed electrode (for example, a ground electrode), or a detectable voltage or current. Moreover, since the switching unit 130 now couples the sensing unit 120b to the second lines 114, the sensing unit 120b is capable of detecting another sensing signal S2, wherein the sensing signal S2 is, for example, a capacitance variation between the second line 114 corresponding to the position P1 and a fixed electrode (for example, a ground electrode).

Then, the sensing unit 120 transmits the sensing signals S1 and S2 to the processing unit 140, so that the processing unit 140 determines a position coordinates of the touch object 170 relative to the touch interface 110 according to the sensing signals S1 and S2. From another point of view, the second line 114 and the first line 112, for example, correspond to X-Y coordinate axes of a Cartesian coordinate system. The processing unit 140 is capable of determining a coordinates (x, y) of the touch object 170 relative to the touch interface 110 according to the sensing signals S1 and S2. However, the invention is not limited thereto, and in another embodiment, a polar coordinate system may also be used to represent the position of the touch object 170 relative to the touch interface 110.

In overall, when none touch object touches or approaches to the touch interface 110, the first line 112 and the second line 114 corresponding to the sensing point SP have two base line values of capacitance, while when the touch object 170 touches or approaches to the touch interface 110, the corresponding sensing point SP is touched, and the base line values of the original capacitances of the first line 112 and the second line 114 may be increased. Then, the sensing unit 120 respectively senses a capacitance increase (for example, the varied sensing signals S1 or S2) of the first line 112 and the second line 114, so that the processing unit 140 is able to determine the touch position of the touch object 170 relative to the touch interface 110.

According to the above descriptions, in case of the first sensing mode, the processing unit 140 of the present embodiment determines the touch position according to the sensing signals S1 and S2 sensed by the sensing unit 120. Namely, in the present embodiment, the first lines 112 and the second lines 114 of the touch interface 110 are similar to sensing lines on a self-capacitance touch interface that extend towards different directions. Since the touch sensing system 180 is now in the self-capacitance sensing mode, the electronic touch apparatus 100 may have advantages of power-saving and ease of signal analysis. Moreover, in the other embodiments, to facilitate a circuit layout, the sensing unit 120 may also be two independent sensing units respectively coupled to the touch interface 110 and the switching unit 130.

FIG. 2 is a block schematic diagram illustrating the electronic touch apparatus 100 of FIG. 1 in the second sensing mode. For example, when the user wants to switch a single-touch mode to a multi-touch mode to execute more functions (for example, enlargement or shrinkage of a window), the processing unit 140 is capable of outputting the control signal SC1 to switch the touch sensing system 180 of the electronic touch apparatus 100 to the second sensing mode, wherein the control signal SC1 is, for example, generated according to an external instruction or touch information of the touch interface 110, and the touch information is, for example, at least one of the sensing signals S1 and S2.

For example, when the processing unit 140 senses that multiple sensing points SP on the touch interface 110 are touched according to the sensing signal S1 or S2, the processing unit 140 automatically outputs the control signal SC1 for controlling a switching operation of the switching unit 130, so that the touch sensing system 180 is switched to the second sensing mode having the multi-touch function, for example. In the present embodiment, the second sensing module is, for example, a mutual-capacitance sensing mode, by which sensing waveforms of sensing points are detected to obtain capacitances between the driving lines and the sensing lines, and touch information of a single point or two or more points are obtained according to the detected capacitance variations.

As shown in FIG. 2, when the electronic touch apparatus 100 is in the mutual-capacitance sensing mode, the second lines 114 of the touch interface 110 are coupled to driving lines 162 of the driving unit 160 through the switching unit 130. On the other hand, the processing unit 140 outputs the control signal SC2 to the driving unit 160, for example, so that the driving unit 160 outputs a driving signal SD to the touch interface 110. In this way, the driving unit 160 is able to transmit the driving signals SD to the touch interface 110 through the driving lines 162 and the second lines 114.

In detail, during an operation, the processing unit 140 sequentially outputs the driving signals SD to each of the driving lines 162 at different time. Then, the driving signals SD are transmitted to the touch interface 110 through the driving lines 162, the switching unit 130 and the second lines 144. Since a capacitive coupling node may be formed at a junction (i.e. the sensing point SP) of the first line 112 and the second line 114, charges on the second line 114 may be coupled to the first line 112 across the second line 114 through a capacitor (not shown) around the sensing point SP. In this way, the sensing unit 120a is capable of sensing the sensing signal S1 through the sensing line 112, wherein the sensing signal S1, is, for example, a current, a voltage or a capacitance.

In detail, when the touch object 170 (for example, the finger) approaches to the sensing point located at the position P1 of the touch interface 110, the driving signal SD originally coupled to the first line 112 is varied, so that the sensing signal S1 detected by the sensing unit 120a at the position P1 is different to that of other positions. Then, the processing unit 140 receives the varied sensing signal S1, and accordingly determines the position coordinates of the touch object 170 relative to the touch interface 110.

Similarly, when two or more touch objects approach to the touch interface 110, the sensing unit 120a is able to sense two or more varied sensing signals S1 and according to a time that the second line 114 receives the driving signal SD, the processing unit 140 can recognize two or more touch positions. Therefore, in case of the mutual-capacitance sensing mode shown in FIG. 2, the electronic touch apparatus 100 is able to recognize multiple simultaneous or almost simultaneous touch events. In other words, the touch sensing system 180 of the electronic touch apparatus 100 is able to detect multiple simultaneous or almost simultaneous touch events, or the touch events occur within a time period on the touch interface 110.

In overall, when the user wants to switch the single-touch mode to the multi-touch mode to execute more functions (for example, enlargement or shrinkage of a window), the processing unit 140 of the present embodiment is able to output the control signal SC1 to the switching unit 130 according to an external instruction or touch information of the touch interface 110, so as to couple the second lines 114 to the driving unit 160, wherein the touch information is, for example, the sensing signal S2. For example, when the sensing unit 120a senses a plurality of varied sensing signals S2, the processing unit 140 performs a logic operation on the sensing signals S2 to generate a control signal SC1, or the processing unit 140 generates the control signal SC1 according to a mathematic combination of the sensing signals S2, so as to control the switching operation of the switching unit 130.

Alternatively, in another embodiment, when the carrier unit 150 is needed to enter a situation requiring integral touch information, for example, a working condition of activating the multi-touch function, the processing unit 140 sends the control signal SC1 to the switching unit 130 to switch the touch sensing system 180 into the mutual-capacitance sensing mode (i.e. the second sensing mode of the present embodiment).

On the other hand, when the carrier unit 150 enters an idle mode due to a power-saving consideration, the carrier unit 150 may count an idle time and automatically send the control signal SC1 to the switching unit 130, so as to switch the touch sensing system 180 into the self-capacitance sensing mode (i.e. the first sensing mode of the present embodiment), wherein the self-capacitance sensing mode has limited functions, though it has an advantage of power-saving. Moreover, in another embodiment, considering the power saving performance of a long-term usage, the processing unit 140 may also receive an external instruction to force the touch sensing system 180 entering the self-capacitance sensing mode.

In other words, the touch sensing system 180 of the electronic touch apparatus 100 is able to provide the self-capacitance sensing mode and the mutual-capacitance sensing mode, so that the user or the system can select a suitable touch sensing mode for different situations. The switching unit 130 is used to switch the self-capacitance sensing mode between the mutual-capacitance sensing mode, and the switching operation of the switching unit 130 is performed according to the obtained touch information or the functional requirement of the carrier unit 150. In this way, the touch sensing system 180 may simultaneously have the advantages of the two sensing modes. Moreover, although the first sensing mode and the second sensing mode are respectively the self-capacitance sensing mode and the mutual-capacitance sensing mode, the invention is not limited thereto, and in the other embodiments, the first sensing mode and the second sensing mode can be respectively the mutual-capacitance sensing mode and the self-capacitance sensing mode.

Figure 3:
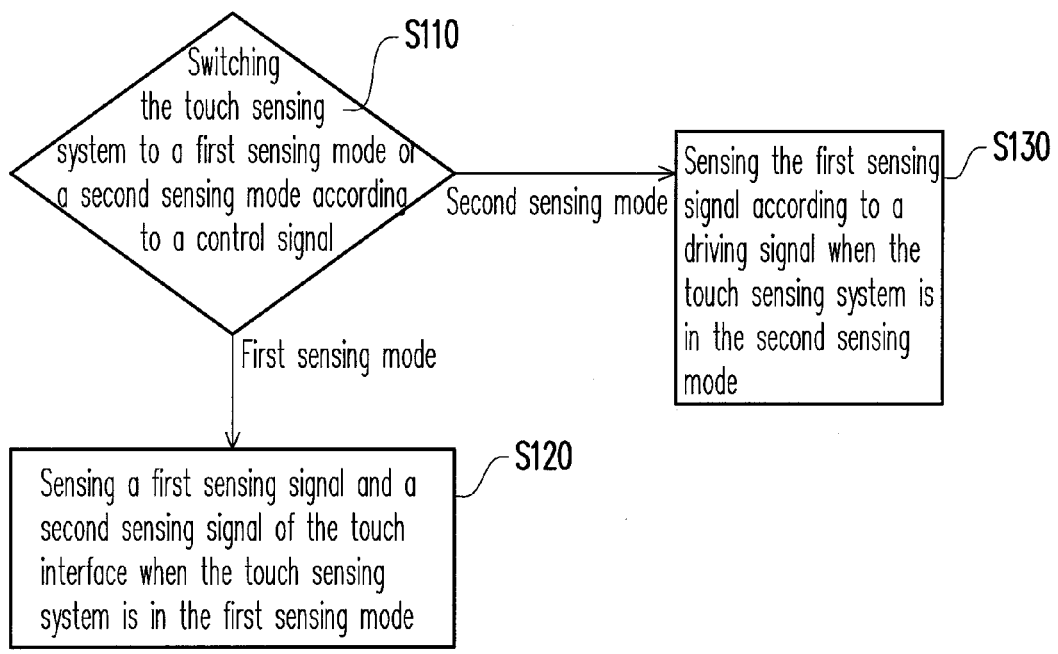
FIG. 3 is a flowchart illustrating a touch sensing method according to an embodiment of the invention.

FIG. 3 is a flowchart illustrating a touch sensing method according to an embodiment of the invention. Referring to FIG. 1 and FIG. 2, the touch sensing method of the invention includes the following steps. First, in step S110, the touch sensing system 180 is switched to the first sensing mode or the second sensing mode according to the control signal SC1. Next, in step S120, when the touch sensing system 180 is in the first sensing mode (for example, the self-capacitance sensing mode shown in FIG. 1), the sensing unit 120 senses a first sensing signal and a second sensing signal (for example, the sensing signals S1 and S2) of the touch interface 110. On the other hand, in step S130, when the touch sensing system 180 is in the second sensing mode (for example, the mutual-capacitance sensing mode shown in FIG. 2), the sensing unit 120 senses the first sensing signal (for example, the sensing signal S1) according to the driving signal SD.

Moreover, in the other embodiments, the touch sensing method further includes generating the control signal SC1 according to touch information of the touch interface 180, wherein the touch information is, for example, at least one of the first sensing signal and the second sensing signal. Alternatively, in another embodiment, the touch sensing method further includes generating the control signal SC1 according to an external instruction. Those with ordinary skill in the art can learn enough instructions and recommendations of the touch sensing method of the present embodiment from the descriptions of the embodiments of FIG. 1 and FIG. 2, and therefore detailed description thereof is not repeated.

In summary, in the present embodiment, since the switching unit is capable of switching the touch sensing system to the first sensing mode or the second sensing mode (for example, the self-capacitance sensing mode and the mutual-capacitance sensing mode) according to the control signal, the touch sensing system is able to provide a suitable sensing mode to the user or the system according to a current condition. In this way, the touch sensing system and the electronic touch apparatus of the invention may simultaneously have the advantage of power-saving of the self-capacitance sensing mode and the advantage of multi-touch function of the mutual-capacitance sensing mode.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch sensing system, comprising:
   a touch interface;
   at least one sensing unit, coupled to the touch interface;
   a switching unit, switching the touch sensing system to a first sensing mode or a second sensing mode according to a control signal,
   wherein when the touch sensing system is in the first sensing mode, the sensing unit senses a first sensing signal and a second sensing signal of the touch interface, and when the touch sensing system is in the second sensing mode, the sensing unit senses the first sensing signal according to a driving signal; and
   a driving unit, directly connected to the switching unit, and outputting the driving signal to the touch interface according to the control signal during the second sensing mode, wherein the at least one sensing unit and the driving unit are directly connected to different pins of the switching unit.

2. The touch sensing system as claimed in claim 1, wherein the at least one sensing unit is directly connected to the switching unit, and senses the second sensing signal during the first sensing mode.

3. The touch sensing system as claimed in claim 1, wherein the at least one sensing unit comprises:
   a first sensing unit, coupled to the touch interface, and sensing the first sensing signal; and
   a second sensing unit, directly connected to the switching unit, and sensing the second sensing signal during the first sensing mode.

4. The touch sensing system as claimed in claim 1, wherein the control signal is generated according to touch information of the touch interface.

5. The touch sensing system as claimed in claim 4, wherein the touch information is at least one of the first sensing signal and the second sensing signal.

6. The touch sensing system as claimed in claim 1, wherein the control signal is generated according to an external instruction.

7. The touch sensing system as claimed in claim 1, wherein the switching unit comprises at least one of a microprocessor, a switching device and a logic operation unit.

8. An electronic touch apparatus, comprising:
   a touch sensing system, comprising:
      a touch interface;
      at least one sensing unit, coupled to the touch interface;
      a switching unit, switching the touch sensing system to a first sensing mode or a second sensing mode according to a control signal,
      wherein when the touch sensing system is in the first sensing mode, the sensing unit senses a first sensing signal and a second sensing signal of the touch interface, and when the touch sensing system is in the second sensing mode, the sensing unit senses the first sensing signal according to a driving signal; and
      a driving unit, directly connected to the switching unit and coupled a processing unit, and outputting the driving signal to the touch interface according to the control signal during the second sensing mode, wherein the at least one sensing unit and the driving unit are directly connected to different pins of the switching unit; and
   the processing unit, coupled to the sensing unit and the switching unit, generating the control signal, and determining at least one touch position on the touch interface according to at least one of the first sensing signal and the second sensing signal.

9. The electronic touch apparatus as claimed in claim 8, wherein the processing unit generates the control signal according to touch information of the touch interface.

10. The electronic touch apparatus as claimed in claim 9, wherein the touch information is at least one of the first sensing signal and the second sensing signal.

11. The electronic touch apparatus as claimed in claim 8, wherein the processing unit generates the control signal according to an external instruction.

12. The electronic touch apparatus as claimed in claim 8, wherein the at least one sensing unit is directly connected to the switching unit, and senses the second sensing signal during the first sensing mode.

13. The electronic touch apparatus as claimed in claim 8, wherein the at least one sensing unit comprises:
    a first sensing unit, directly connected to the touch interface, and sensing the first sensing signal; and
    a second sensing unit, directly connected to the switching unit, and sensing the second sensing signal during the first sensing mode.

14. The electronic touch apparatus as claimed in claim 8, the switching unit comprises at least one of a microprocessor, a switching device and a logic operation unit.

15. A touch sensing device, comprising:
    a driving unit;
    a first sensing unit, coupled to a touch interface;
    a second sensing unit; and
    a switching unit, coupled between the touch interface, the driving unit and the second sensing unit, wherein the switching unit controls the connection of the touch interface to the driving unit or the second sensing unit, and in response to a control signal, is switched to connect the touch interface to the second sensing unit in a first sensing mode and to connect the touch interface to the driving unit in a second sensing mode.

16. The touch sensing device as claimed in claim 15, wherein in the first sensing mode, the first sensing unit senses a first sensing signal from the touch interface, and the second sensing unit senses a second sensing signal from the touch interface.

17. The touch sensing device as claimed in claim 15, wherein in the second sensing mode, the first sensing unit senses a first sensing signal from the touch interface according to a driving signal.

18. The touch sensing device as claimed in claim 15, wherein the switching unit comprises a plurality of first terminals coupled to the first sensing unit, a plurality of second terminals coupled to the second sensing unit and a plurality of third terminals coupled to the driving unit.

* * * * *